(12) United States Patent
Mimouni et al.

(10) Patent No.: US 8,030,604 B2
(45) Date of Patent: Oct. 4, 2011

(54) OPTICAL COMPONENT OPERATING IN NEAR-FIELD TRANSMISSION

(75) Inventors: Salim Mimouni, Grenoble (FR); Ludovic Poupinet, Sassenage (FR)

(73) Assignee: Commissariat a l'Energie Atomique, Paris (FR)

( * ) Notice: Subject to any disclaimer, the term of this patent is extended or adjusted under 35 U.S.C. 154(b) by 257 days.

(21) Appl. No.: 12/304,131

(22) PCT Filed: Jun. 8, 2007

(86) PCT No.: PCT/EP2007/055665
§ 371 (c)(1), (2), (4) Date: Dec. 10, 2008

(87) PCT Pub. No.: WO2007/144313
PCT Pub. Date: Dec. 21, 2007

(65) Prior Publication Data
US 2009/0205090 A1   Aug. 13, 2009

(30) Foreign Application Priority Data
Jun. 12, 2006 (FR) ................... 06 52095

(51) Int. Cl.
*G01J 1/20* (2006.01)
(52) U.S. Cl. .......... 250/201.9; 250/505.1; 850/30; 430/396; 369/112.03; 369/112.07; 369/112.25
(58) Field of Classification Search ........ 250/201.9, 250/237 R, 237 G, 492.1, 493.1, 503.1, 505.1, 250/526, 574; 369/112.01, 112.03, 112.04, 369/112.06, 112.07, 112.18, 112.25; 430/5; 430/391; 850/30
See application file for complete search history.

(56) References Cited

U.S. PATENT DOCUMENTS

| 5,125,750 | A | 6/1992 | Corle et al. |
| 6,307,827 | B1 | 10/2001 | Nishiwaki |
| 7,279,253 | B2 * | 10/2007 | Yamada et al. ............ 430/5 |
| 7,288,776 | B2 * | 10/2007 | Lee et al. .............. 250/493.1 |
| 2002/0033953 | A1 | 3/2002 | Hill |
| 2003/0091284 | A1 * | 5/2003 | Maisenholder et al. ...... 385/37 |
| 2004/0248144 | A1 * | 12/2004 | Mir ........................ 435/6 |
| 2005/0064303 | A1 * | 3/2005 | Yamada et al. ............ 430/5 |
| 2005/0161594 | A1 | 7/2005 | Hollingsworth et al. |

(Continued)

FOREIGN PATENT DOCUMENTS

JP   2001-023223 A   1/2001
(Continued)

OTHER PUBLICATIONS

International Search Report for PCT/EP2007/055665.
French Search Report for FR 0652095.
Gan et al:, "Strategies for employing surface plasmons in near-field optical readout systems", Optics Express 2385, vol. 14, No. 6. Mar. 3, 2006.

(Continued)

*Primary Examiner* — Bernard E Souw
(74) *Attorney, Agent, or Firm* — Pearne & Gordon LLP

(57) ABSTRACT

A near-field detection optical component operating in transmission. It includes at least one portion (11*b*) forming at least one grating (11) of diffraction microstructures (11*a*) succeeding one another over several periods (p), this grating (11) being capable of converting evanescent waves (16), which are established between the component and an object (12) located in the near field, when it reflects or emits radiation having a wavelength, into propagating waves (16') by a diffraction effect during transmission through the portion (11*b*) forming the grating (11) of diffraction microstructures (11*a*). The period (p) of the grating (11) being of the order of magnitude of the wavelength of the radiation.

24 Claims, 3 Drawing Sheets

U.S. PATENT DOCUMENTS

| | | |
|---|---|---|
| 2006/0153045 A1* | 7/2006 | Lee et al. .................. 369/112.27 |
| 2007/0013999 A1* | 1/2007 | Marks et al. ................... 359/368 |
| 2007/0172745 A1* | 7/2007 | Smith ............................... 430/5 |
| 2008/0002556 A1* | 1/2008 | Lee et al. .................. 369/112.27 |
| 2010/0149948 A1* | 6/2010 | Mimouni et al. ........ 369/110.01 |

FOREIGN PATENT DOCUMENTS

| | | |
|---|---|---|
| WO | 99/44197 A1 | 9/1999 |
| WO | 00/23840 A1 | 4/2000 |
| WO | 03/062864 A3 | 7/2003 |

OTHER PUBLICATIONS

Chau et al:, "Near-field optics simulation of a solid immersion lens combining with a conical probe and a highly efficient solid immersion lens-probe system", Journal of Applied Physics vol. 95, No. 7. Apr. 1, 2004.

Marks:, "Near-field diffractive elements", Optics Letters vol. 30, No. 14. Jul. 15, 2005.

* cited by examiner

OPTICAL COMPONENT OPERATING IN NEAR-FIELD TRANSMISSION

TECHNICAL FIELD

The present invention relates to an optical component operating in near-field transmission. Such a component may be incorporated into a near-field detection device intended to irradiate with radiation an object and to collect the reflected radiation or into a detection device intended to collect radiation emitted by an object, this component being placed in a near field relatively to the object. These devices may be read-out heads or read/write heads for optical information on an optical information medium or near-field probes of optical microscopes for example.

It is reminded that around the object a distinction is made between two areas, the first is the far field area, in which a detector is placed and the second is the near field area in the vicinity of the surface of the object. In the near field, the distance between the object and the optical component is less than $\lambda/2\pi$, $\lambda$ represents the wavelength of the radiation reflected or emitted by the object. The constraint on the near-field domain may even by released to $\lambda$ instead of $\lambda/2\pi$, in fact at $\lambda/2\pi$ the near-field signal is 50% of the one originating from the object, therefore it is detectable. The distance between the object and the optical component may be set to be less than $\pi$ as a near-field criterion.

STATE OF THE PRIOR ART

Near-field optical detection devices are described in the documents numbered as [1], [2], [3], [4], [5], and [6]; the complete references of which are found at the end of the description.

In the first four [1], [2], [3], [4], a solid immersion lens 1 is generally used as a near-field optical component. This lens 1 made in a material with a high refractive index such as LasF35 glass (designation from the Schott corporation catalogue), or diamond, generally has a first spherical diopter 2 which faces the focusing objective 3 and a second diopter 4 which faces the disk 5. This second diopter 4 may be planar as illustrated in FIG. 1A or convex as indicated in document [3]. A detector 8 is placed on the opposite side from the focusing objective 3 relatively to the solid immersion lens 1.

Provision is made for truncating the lens 1 between both diopters 2, 4, the truncation being made from the first diopter 2 to the second diopter 4 in order to minimize the surface of the second diopter 4 facing the object 5, which in this case is an optical disk. It was even proposed, as illustrated in FIG. 1B and described in document [4], to place a substantially frustro-conical endpiece 6 in a dielectric material beside the second diopter 4. The substantially frustro-conical endpiece 6 points towards the object (which is not illustrated in FIG. 1B). A metal coating 7 is applied on a portion of the side surface of the substantially frustro-conical endpiece 6, on the opposite side from the most pointed portion, this coating 7 spares the most pointed portion of the substantially frustro-conical endpiece 6 on the side of the object 5. Such a substantially frustro-conical endpiece 6 is subsequently assimilated to an optical probe placed at the end of an optical fiber notably in the optical microscopes with near-field detection. In this microscope configuration, the optical fiber includes a core and a cladding. It ends with a pointed portion, the end or aperture of which made in the dielectric material of the core, has a diameter which is of the order of a few tens of nanometers (for example about 50 nanometers), which is much smaller than the wavelength of the radiation used. The side surface of the pointed portion, except for the tip, is metalized. The metal coating 7 is used for channeling the radiation, which illuminates the object or which is collected from the object.

The resolution capability of such detection devices depends on the size of the aperture and on the distance to the object and no longer on the wavelength.

The probes detect the near electromagnetic field which is found facing their tip. With this, information may be obtained on the details of the object of a smaller size than the wavelength. The electromagnetic field reflected by the object is coupled in the aperture of the probe and is then led through the fiber right up to a detector. The near field is detected locally. Detection is direct. The nature of the field is not altered. By mapping the field, the object may be reconstructed.

It is reminded that the object 5 emits or reflects electromagnetic waves which bear information on its topography and which depend on the optical properties of the material of its surface. The radiated or reflected spectrum may be divided in two parts, one of which is formed by a so-called homogeneous cone, containing propagating electromagnetic waves, bearing information with frequencies below the cutoff frequency of the optical system in its entirety and which are radiated and may therefore be detected at a larger distance than the wavelength of the radiation used, at the detector. The other part formed by a so-called inhomogeneous cone contains evanescent electromagnetic waves located in the vicinity of the surface of the object and the amplitude of which decreases exponentially upon their propagating away from the object. These evanescent non-radiated waves are carriers of information on subwavelength details of the object but they remain localized and cannot be directly detected by the detector. The solid immersion lens or probe will collect them on site by a frustration effect.

Indeed, each radiation may be broken down into an angular spectrum which is a set of wave vector pairs (kx, kz) where kx is a transverse component and kz a propagation component. Both components are related by the dispersion relationship:

$kx^2 + kz^2 = n^2 k0^2$ with n the refractive index of the medium and $k0 = 2\pi/\lambda$.

The homogeneous cone is defined by the set of wave vector pairs (kx, kz) which verifies:

$-k0 \leq kx \leq k0$.

The inhomogeneous cone may be defined by the set of wave vector pairs which verifies:

$-zk0 > kx > k0$.

The signal level detected by the probe only depends on the portion of the object present under the tip of the probe. This tip is very small; it has a minimum diameter from a few nanometers to hundreds of nanometers, this diameter remaining smaller than the wavelength of the reflected or emitted radiation from the object. Thus, when the probe is in a determined position, it only detects the details of the object which are facing its tip. Point-to-point detection is achieved and therefore a point-to-point measurement. By scanning the object with the probe it is possible to establish near-field maps by juxtaposing the information detected at each point.

In the document referenced as [5] a plate-shaped metal probe for reading optical disks is described. It includes a central aperture and shifted relative to this central aperture one or two pits, these pits being placed on the side of the disk to be read. With these pits, more near field may be brought back into the central aperture of the probe by means of surface waves, so-called plasmons, and visibility of the marks borne by the disk may be increased. The presence of a mark coinciding with a pit creates a resonant cavity for plasmons, thereby altering the transmitted field. Visibility of the marks is enhanced. Plasmons are particular evanescent waves.

In the document referenced as [6], a metal detection probe for a near-field optical microscope or for reading information on a medium is described. It includes a pipette-shaped portion with on the opposite side from its free end, a metal flange with periodical relief features. This flange is used for bringing back more electromagnetic field inside the pipette.

In both of these last documents, there is no conversion by a diffraction effect during transmission.

Controlling the distance between the tip and the object is crucial and collecting the radiation reflected or emitted by the object is performed with a slow rate because of the small size of the tip and of the point-to-point operation. This near-field detection type is not well adapted to the readout of information on an optical disk. The marks which are borne by the disk are detected one after the other, gradually as the disk rotates. For this to be of interest, the throughput would have to be able to be more significant.

DISCUSSION OF THE INVENTION

The object of the present invention is precisely to propose an optical component operating in near-field transmission with which the drawbacks mentioned above of near-field detection devices may be avoided. In particular, the optical component is rid of the drawbacks of the point-by-point operating components which are not compatible with fast readout of information over large surfaces.

In particular, an object is to propose such a component which is capable of providing a radiation collection rate which is more significant than what is obtained today in near-field detection devices whether these are near-field optical microscope probes or optical information readout heads.

Another object is to be able to recover inhomogeneous waves and therefore to detect details of the object which cannot be seen with conventional optical systems.

In order to manage this, the present invention is an optical component operating in near-field transmission including at least one portion forming at least one grating of diffraction microstructures succeeding one another other over several periods, this grating being capable of converting evanescent waves which are established between the component and an object located in the near field when it reflects or emits radiation having a wavelength, into propagating waves by a diffraction effect during transmission through the portion. The period of the grating is of the order of magnitude of the wavelength of the radiation emitted or reflected by the object.

Advantageously, the grating period will be selected to be less than the wavelength of the radiation emitted or reflected by the object.

Thus, the optical component has a lateral size larger than several wavelengths of the radiation, or even substantially equal to about a hundred wavelengths of the radiation.

The period p of the grating may verify the relationship: $kx-k0<2\pi/p<kx+k0$ with $k0=2\pi/\lambda$ and $kx$ being the transverse component of the evanescent waves emitted by the object.

Alternatively, the period p of the grating may verify the $kx-2k0<2\pi/p<kx-k0$ with $k0=2\pi/\lambda$ and $kx$ being the transverse component of the evanescent waves emitted by the object.

The optical component may further include at least one portion amplifying evanescent waves before their conversion, which cooperates with the portion forming the diffraction microstructure grating.

The amplifying portion may be placed adjacent to the portion forming the diffraction microstructure grating.

The amplifying portion may be made in a metal material based on gold, silver, platinum, aluminum, indium-antimony, or in a semi-conducting material.

The amplifying portion will preferably have a thickness substantially smaller than the wavelength of the radiation.

The amplifying portion may cover a face of the portion forming the grating of diffraction microstructures, on the opposite side from the diffraction microstructures.

The amplifying portion and the portion forming the grating of diffraction microstructures may be made in a same material.

The optical component may advantageously be formed with an alternating stack, with at least one portion forming the grating of diffraction microstructures, and one or more amplifying portions, or else with several portions each forming the grating of diffraction microstructures and at least one amplifying portion.

The portion forming the grating of diffraction microstructures may be made in an electrically conducting material and/or in a dielectric material.

The grating of diffraction microstructures may include protruding portions separated by recessed portions or solid portions separated by through-holes or by solid electrically conducting portions separated by solid dielectric portions.

The grating of diffraction microstructures may include substantially circular and concentric corrugations.

In order to improve the transmission of the optical component, it is preferable that the grating of diffraction microstructures be invariant under rotation.

The portion forming the grating of diffraction microstructures may be period-modulated.

In order that the optical component may be used with several different radiations, it is possible that the portion forming at least one grating of diffraction microstructures includes several gratings side-by-side, these gratings having different periods.

In order to increase the transmission of the optical component, it may be provided that the portion forming the grating of diffraction microstructures includes broken periodicity in a central portion.

The broken periodicity portion may be solid or be a void, which facilitates centering of the optical component.

If there is an amplifying portion, it is preferable that the void extend into the amplifying portion.

The present invention also relates to a near-field detection optical device, which includes an optical component defined in this way.

The near-field detection optical device may include a detector placed downstream from the optical component, for the converted propagating waves.

The near-field detection optical device may include a solid immersion lens placed downstream from the optical component, the solid immersion lens being placed upstream from the detector for the converted propagating waves in the presence of the detector.

The near-field detection optical device may also be a readout head or a read/write head on an optical information medium or a near-field optical microscope probe.

SHORT DESCRIPTION OF THE DRAWINGS

The present invention will be better understood upon reading the description of exemplary embodiments given purely as an indication and by no means as a limitation, with reference to the appended drawings wherein.

Identical, similar, or equivalent portions of the various figures bear the same numerical references so as to facilitate the passing from one figure to the other.

The various portions illustrated in the figures are not necessarily illustrated according to a uniform scale, in order to make the figures more legible.

DETAILED DISCUSSION OF PARTICULAR EMBODIMENTS

Figure 1A:
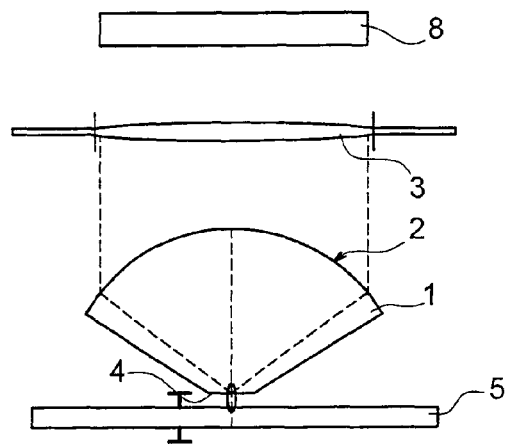
FIGS. 1A, 1B (already described) show two exemplary near-field optical information readout heads close to the state of the art.
Figure 1B:
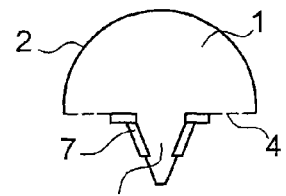
Figure 2:
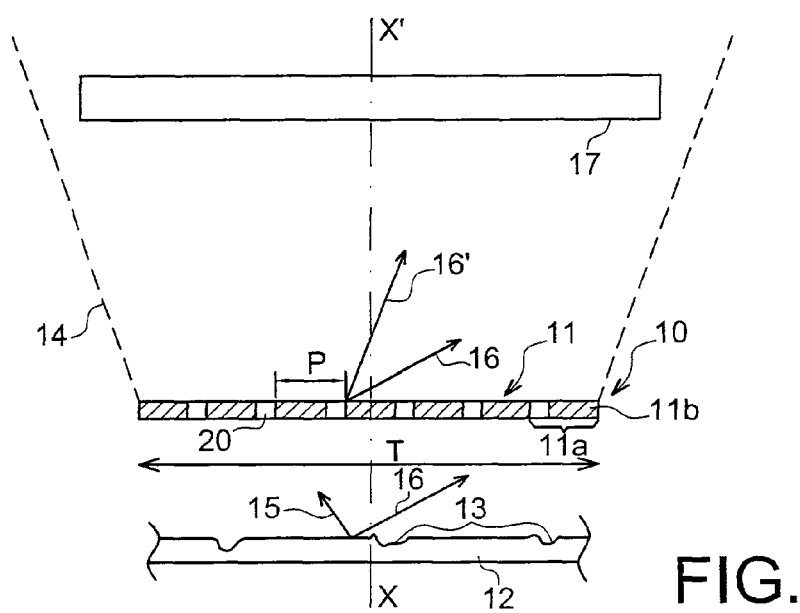
FIG. 2 shows in a cross-sectional view an exemplary optical component according to the invention mounted in the near-field detection device.

Reference will now be made to FIG. 2 which shows a first exemplary near-field detection optical component, object of the invention.

This optical component operates in transmission and includes at least one portion 11*b* forming at least one grating 11 of diffraction microstructures 11*a*. This grating 11 includes at least three successive diffraction microstructures 11*a*, they are separated by a same period p. In FIG. 2, the grating 11 of diffraction microstructures 11*a* is found on a face of a plate, it is turned towards the object 12, but it is possible that it turns its back to the object 12 in other configurations, as this will be seen in FIG. 4A, subsequently.

It is assumed in the described example in FIG. 2 that the object 12 is a sample to be observed and that the optical component 10 is mounted in a probe of a near-field optical microscope. Other objects may be detected with such an optical component, these may be optical information media, and in this case, the optical component object of the invention is incorporated into a head for reading out or reading/writing optical information.

These diffraction microstructures 11*a* may be formed by corrugations, i.e. protruding portions separated by recessed portions or solid portions separated by through-holes or electrically conducting solid portions separated by dielectric portions (for example a silver support with through-holes and therefore air) or even dielectric portions separated by other dielectric portions of various natures (for example silica and glass or other material).

In FIG. 2, the grating 11 of diffraction microstructures 11*a* includes solid portions separated by through-holes 20. The through-hole 20 may be made in a thin metal layer by photolithography.

The object 12, when it is illuminated by radiation or when it emits radiation, emits two kinds of radiations as explained earlier. Therefore, in the vicinity of the object 12, a distinction is made between homogeneous waves 15 and evanescent waves 16. Homogeneous waves 15 may propagate in the homogeneous cone 14, their wave vector has a small transverse component kx, such that $|kx| \leq k0$.

In conventional near-field detection devices, a detector 17, which will be responsible for collecting homogeneous waves which will have reached it, is placed in the homogeneous cone 14.

Evanescent waves 16 have a strong transverse component kx such that kx>k0, they are localized in the vicinity of the object 12. The evanescent waves contain information relating to details 13 with subwavelength sizes of the object 12, i.e. the finest details of the object.

The optical component, object of the invention, has the purpose of converting evanescent waves 16 into waves 16' which may propagate in the homogeneous cone 14 and reach the detector 17. The conversion is carried out by a diffraction effect during transmission through the grating 11 of diffraction microstructures 11*a*. The diffraction effect during transmission of the grating 11 is expressed by the transformation of the transverse component kx into a component kx' such that:

$$kx' = kx \pm mG \quad (1)$$

with m, a natural number, representing the diffraction order and $G = 2\pi/p$ representing the spatial frequency present in the object 12 which is intended to be detected. The quantity p is the period of the grating of diffraction microstructures, it is of the order of magnitude of the wavelength of the radiation reflected or emitted by the object 12. By order of magnitude is meant that it is comprised between about the tenth and twice the wavelength.

Advantageously, the period p of the grating will be selected to be smaller than the wavelength of the radiation reflected or emitted by the object 12.

It is advantageous to select the diffraction order m equal to −1 in order to benefit from strong transmission. Of course it is possible to select another value for m and notably the value +1. The transverse component kx' after conversion through the optical component 10 undergoes a rotation in the anti-clockwise direction relatively to the transverse component kx before conversion. It is brought back into the homogeneous cone 14 and is propagating and radiative. It may be detected by the detector 17. The purpose of the optical component 10 according to the invention is to allow injection of subwavelength information into the homogeneous cone 14, this information never being located there previously since it remained in the inhomogeneous cone and did not freely propagate up to the detector.

In order to optimize this conversion, it is preferable that the period p of the grating 11 of diffraction microstructures be tuned onto the frequency of the evanescent wave 16 emitted by the object 12. When the period p is set, conversion of near field into far field will be performed on the evanescent waves 16, the transverse component kx of which verifies the relationship:

$$2\pi/p - k0 < kx < 2\pi/p + k0 \quad (2)$$

the period of the grating verifying:

$$kx - k0 < 2\pi/p < kx + k0 \quad (3)$$

If it is attempted to convert evanescent waves with a higher spatial frequency above k0, i.e. contained in a larger frequency range, the outcome is:

$$2\pi/p + k0 < kx < 2\pi/p + 2k0 \quad (4)$$

This requires selection of a smaller period p verifying:

$$kx - 2k0 < 2\pi/p < kx - k0 \quad (5)$$

Figure 3A:
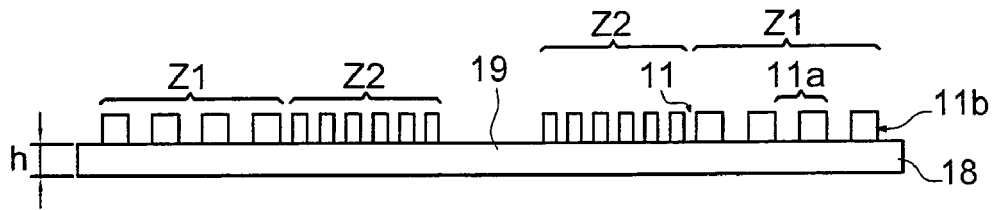
FIGS. 3A, 3B show in a cross-sectional view two novel exemplary optical components according to the invention, these components being period-modulated.
Figure 3B:
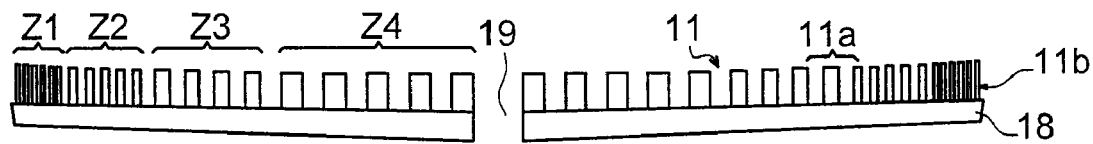

This may lead to producing an optical component according to the invention, modulated with a period p, i.e. having a grating with a variable period as illustrated in FIGS. 3A, 3B. Several types of inhomogeneous waves may thereby be converted at a time. The presence of several periods improves the global performance of the component. With periodicity, frequency or spectral information may be transmitted.

In this case, several areas z1-z4 are distinguished in the grating 11, each having their period p1, p2, p3, p4, these periods being different from one area to the other. In each area, the microstructures succeed one another over several constant periods. These areas z1, z2, z3 may be nested within each other or may succeed one another, this depends on the pattern formed by the diffraction microstructures 11a. It is assumed in FIGS. 3A, 3B that the grating 11 of diffraction microstructures 11a is formed with protruding portions separated by substantially circular concentric grooves. A optical component invariant under rotation is then obtained.

In FIG. 3A, there are only two concentric areas z1, z2, the z1 area being more central than the area z2. Their periods p1, p2 are increasing from the area z1. In FIG. 3B, four concentric areas z1, z2, z3, z4 may be distinguished in this order from the central portion of the portion 11b towards its edge. Their periods p1, p2, p3, p4 are decreasing from the area z1. Many other shapes may be contemplated for diffraction microstructures 11a.

Figure 4A:
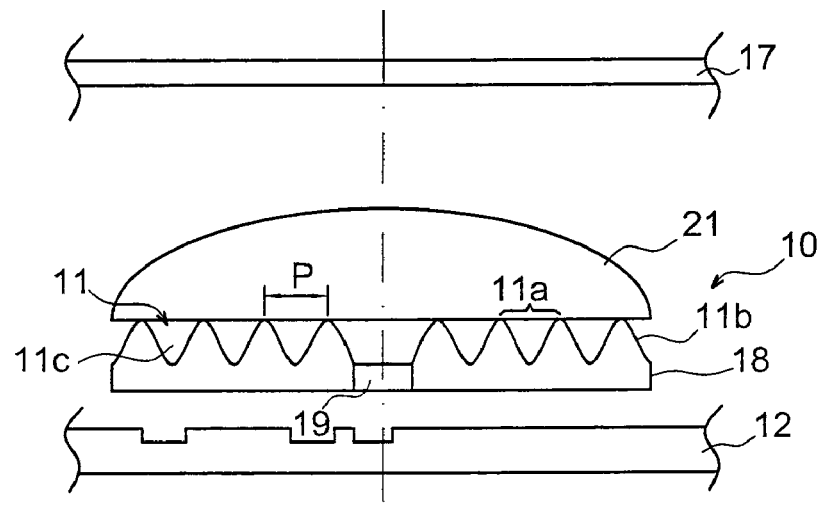
FIGS. 4A, 4B show in a cross-sectional view, two novel exemplary optical components according to the invention.

Instead of having the grating 11 of diffraction microstructures produced by protruding portions separated by substantially circular concentric grooves, it may be produced by protruding portions separated by helicoidal grooves, as illustrated in FIG. 3B, or further by substantially rectilinear parallel grooves as illustrated in FIG. 4A.

Figure 4B:
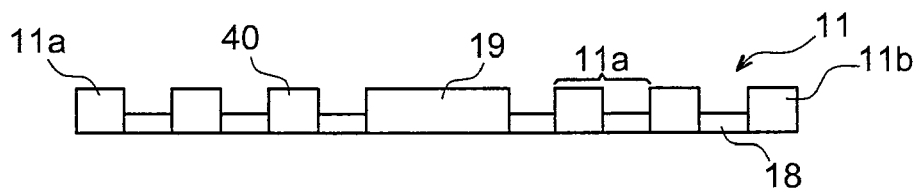

In another embodiment, it may contemplated that the portion 11b forming the grating 11 of diffraction microstructures 11a is produced by a pattern of studs 40 distributed over a base set back as illustrated in FIG. 4B. In this configuration, the base forms the amplifying portion 18 which will be described later on.

Figure 6:
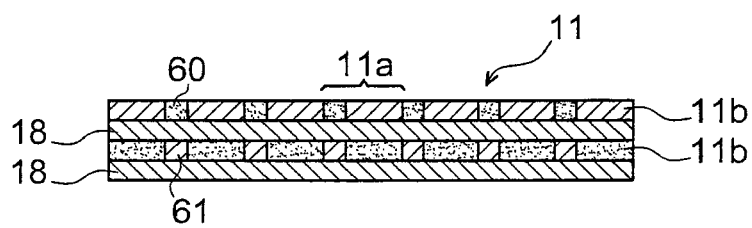
FIG. 6 shows in a cross-sectional view an exemplary optical component according to the invention with several portions forming a grating of diffraction microstructures and several stacked amplifying portions.

It may also be contemplated that the portion 11b forming the grating of diffraction microstructures 11a is formed with dielectric material pads 60 embedded in a metal plate or conversely metal pads 61 embedded in a dielectric material plate as illustrated in FIG. 6.

Many other configurations are possible and the described examples are not limiting.

The portion 11b forming the grating 11 of diffraction microstructures 11a may be made in a metal material based on aluminum, gold, silver, platinum and/or a dielectric material such as glass, ceramic, diamond, organic or inorganic resins, or even silicon.

The optical component according to the invention has a lateral size T which is larger than the wavelength of the radiation reflected or emitted by the object 12, which was not the case in the prior art where the tip of the probes was smaller than the wavelength. By lateral size T of the optical component 10, is meant its largest dimension transverse to the optical axis XX', i.e. the general direction of wave propagation towards the detector 17. This may be the diameter of the portion 11b, if it is circular. This lateral size T may exceed several times the wavelength and may reach about hundred wavelengths. A large expanse of the component is desired since the evanescent waves to be converted should encounter several periods of the grating in order to be effectively converted into propagating waves. If the optical component is furthermore period-modulated, as this was described above, its lateral size is all the larger, for example of the order of about hundred micrometers.

As mentioned earlier, selection of the period p is important so that conversion is as best as possible and for removing parasitic. Best conversion conditions are obtained when diffraction is performed with a single order m, preferably equal to the absolute value one and when the zero order (m=0) is cut off. The fact that the zero order is cut off means that propagating homogeneous waves 15 are strongly attenuated when crossing the optical component 10 so as not to be added to the propagating waves 16' obtained after conversion and which are present in the homogeneous cone 14. The attenuation of these homogeneous waves 15, notably in the case when the component is period-modulated, is significant since a single link may be established between the information received by the detector 17 in the near field and its origin at the object 12.

The initially homogeneous propagating waves 15 are themselves converted into evanescent waves (not shown) with a diffraction order equal to the absolute value one during their crossing of the optical component, if the period p is wisely selected. They do not therefore reach the detector 17. A value of the period p close to the median of the intervals specified above by the relationships (3), (5) is particularly suitable.

It is advantageous to be able to amplify the evanescent waves 16 before their crossing of the optical component object of the invention. In this way the evanescent waves 16 to be converted, may be favored in terms of signal level, and as compared with other waves considered as parasitic waves.

Amplification may be carried out by including in the optical component, on the side of the object 12, an amplifying portion 18, which optically excites plasmons or surface waves. This amplifying portion 18 may be produced in a material having a dielectric constant with a negative real part. Such materials are for example noble metals such as gold, silver, platinum, and even aluminum, indium-antimony (InSb), or even semi-conductors such as silicon.

This amplifying portion 18 may form a bilayer with the portion 11b bearing the grating 11 of the diffraction microstructures 11a by being stacked with it as illustrated in FIG. 3A. Alternatively, as illustrated in FIG. 4B, the amplifying portion 18 and the portion 11b forming the grating 11 of diffraction microstructures 11a may be embedded in each other. Amplification and conversion are simultaneous. The photon with a size λ simultaneously sees the grating and the amplifying layer.

The thickness h of the amplifying portion 18 will advantageously be smaller than approximately the wavelength of the radiation reflected or emitted by the object 12.

The material of this amplifying portion 18 is selected for its dielectric constant which should promote amplification of evanescent waves and occult propagating homogeneous waves. This amplifying portion 18 has the function of a high pass frequency filter. In the absence of any amplifying portion, the grating of diffraction microstructures will be placed preferably facing the object 12 to be observed. The latter will preferably be in metal.

The portion 11a provided with the grating 11 of diffraction microstructures 11b and the amplifying portion 18 may be made in a same material as illustrated in FIG. 3B or on the contrary made in different materials as notably illustrated in FIGS. 3A, 4A. The amplifying portion 18 may be used as a support for the portion 11a forming the grating 11 of diffraction microstructures, notably in the case when the latter is provided with grooves and that the solid portions are non-contiguous as illustrated in FIG. 3A and assume the shape of concentric rings or rectilinear bars.

It is possible to provide in a central region of the optical component according to the invention, an area 19 of broken periodicity, as illustrated in FIGS. 3A, 3B, 4A, 4B. This area 19 of broken periodicity may be a void as in FIGS. 3A, 3B, 4A or a solid portion free of any diffraction microstructure as in FIG. 4B. This solid portion may be metal or dielectric. This area 19 of broken periodicity has the advantage of improving transmission of the optical component notably when the diffraction microstructures 11a are solid. It also allows a marker to be given for centering the optical component and for servo-control of the head or of the probe on which the optical component will be mounted.

When this is a void 19, the latter may extend into the amplifying portion 18 as illustrated in FIGS. 3B, 4A. The low frequency components of the object 12 to be detected pass through the area of broken periodicity 19. At this area of broken periodicity 19, there is no frequency conversion, this gets closer to what happens in conventional devices of the probe type or of the readout or read/write head type. Transmission through the void 19 is greatly improved when the grating 11 of diffraction microstructures 11a has relief features with circular symmetry and when it is solid.

Figure 5:
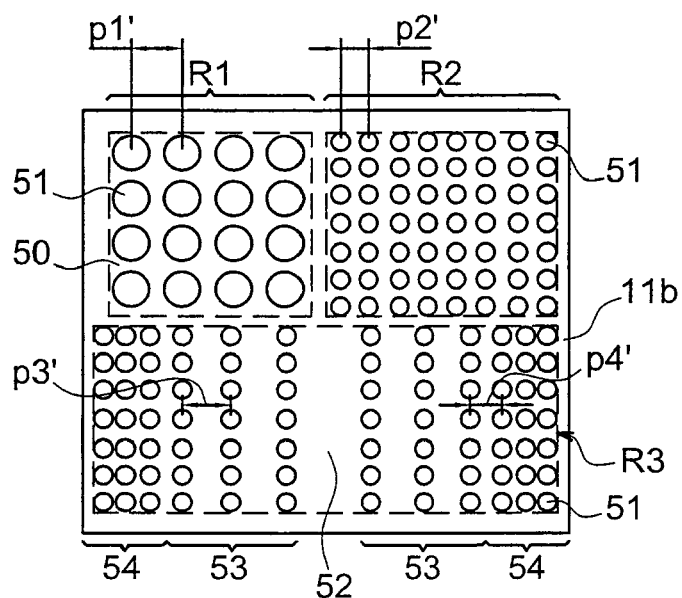
FIG. 5 shows in a top view, a further exemplary optical component according to the invention provided with several gratings of diffraction microstructures.

Attention will now be focused on the optical component according to the invention illustrated in FIG. 5. It is illustrated in a top view and only its portion 11b forming several gratings R1, R2, R3 of diffraction microstructures is seen, these gratings R1, R2, R3 being side by side. Three different gratings R1, R2, R3 of diffraction microstructures are distinguished. It is assumed that these gratings R1, R2, R3 are produced by a substantially rectangular solid layer 50, provided with through-holes 51. The through-holes 51 are arranged in lines and columns, the gratings R1, R2, R3 being two-dimensional. It may be contemplated that a grating be one-dimensional, it may be formed with holes laid out along a single line or a single column. The first grating R1, placed above on the left in FIG. 5, has a period p1'. The second grating R2 placed above on the right has a period p2'. Both of these gratings R1, R2 substantially occupy the same surface area. The period p1' is larger than the period p2'. The holes 51 of the first grating R1 are larger than the holes 51 of the second grating R2, they are also less numerous.

The third grating R3 placed in the lower portion of the layer 50, has a surface area substantially equal to that of the first grating R1 plus the one of the second grating R2. It has a variable period and has in its central portion an area of broken periodicity 52 and then on either side, two first strips 53 having a period p3' then further away from the area of broken periodicity 52, two other strips 54 having a period p4'. The different strips 53, 54 are juxtaposed. The period p3' is larger than the period p4'. The holes 51 placed in these strips 53, 54 are substantially of the same size. The period of the third grating R3 decreases all the more as one moves away from its central portion upon passing from p3' to p4'.

In order to further increase the intensity of the information which will reach detector 17, one may be led to produce the optical component of the invention by alternately stacking at least one portion of 11b, provided with at least one grating 11 of diffraction microstructures 11a and one or more amplifying portions 18 or else several portions 11b each provided with at least one grating 11 of diffraction microstructures and at least one amplifying portion 18. In this superposition, evanescent waves to be converted first cross an amplifying portion 18 before reaching a portion 11b forming at least one grating 11 of diffraction microstructures 11. This embodiment is illustrated in FIG. 6.

A detailed description will now be made of an exemplary optical component according to the invention again with reference to FIG. 4A. It is assumed that the component according to the invention has been integrated into a near-field detection device which may be a head for reading optical information or a read/write head.

The near-field detection device includes a component 10 according to the invention which cooperates with a detector 17. A solid immersion lens 21 is inserted between the optical component 10 according to the invention and the detector 17. More specifically, the solid immersion lens 21 and the portion 11b provided with the grating 11 of diffraction microstructures 11a are assembled with each other by any suitable means such as bonding or any another means. This assembling is performed on the second diopter of the solid immersion lens 21, i.e. the one which is closest to the object to be detected 12.

It is assumed that the detection device is intended to operate with radiation having a wavelength of 400 nanometers.

It is assumed that the optical component object of the invention has a portion 11b provided with a grating 11 of diffraction microstructures 11a and a stacked amplifying portion 18, the amplifying portion 18 being found on the side of the object 12 to be detected. The grating 11 of diffraction microstructures 11a includes substantially circular and concentric grooves 11c. The period p of the grating 11 is substantially constant and has the value of 100 nanometers. The width of the grooves 11c is 50 nanometers. The depth of the grooves 11c is 20 nanometers. The thickness of the amplifying layer 18 in a noble metal for example, is 30 nanometers. The total thickness of the component object of the invention is 50 nanometers. It is assumed that the amplifying portion 18 and the portion 11b forming the grating of diffraction microstructures are made in the same material, a noble metal for example.

In a central area of the optical component, a void 19 is provided which extends into the amplifying portion. For an optical component with a diameter of about 40 micrometers, the void 19 may have a diameter comprised between about 0.02 micrometers and 10 micrometers.

By providing the amplifying portion 18 which operates by a plasmon effect, i.e. by intense excitation of evanescent electromagnetic waves, the transmission of a range of high spatial frequencies above $2\pi/\lambda$ may be promoted. By the presence of the area of broken periodicity 19 in the central portion of the portion 11b forming the grating 11 of diffraction microstructures 11a, transmission may also be further increased and a marker may be provided for centering and controlling the position of the detection device including this optical component. Centering and controlling may be accomplished even if the area of broken periodicity is solid.

The portion 11b forming the grating 11 of diffraction microstructures 11a has the function of converting the transmitted electromagnetic field by the amplifying portion 18 into a far field and therefore allows it to reach the detector 17 by passing through the solid immersion lens 20, insofar that it is present. It then becomes possible to process the signal reaching the detector 17 because its frequencies mainly correspond to those amplified by the plasmon effect in the amplifying portion 18. These frequencies are generally above the conventional limit of far field detectors since the period of the grating 11 is less than the wavelength of the radiation reflected or emitted by the object 12.

The resolution R of such an optical component may then be roughly evaluated by introducing the refractive index n1 of the medium in which the object 12 is immersed (generally air, so n1=1) and the refractive index n2 of the medium in which the waves converted by the component object of the invention propagate upon their exiting the component. This may be the refractive index of the solid immersion lens in the configuration of FIG. 4A. This resolution R is expressed by:

$$R=\lambda/2(n1+\lambda n2/p)$$

This formula show that for a period p smaller than the wavelength λ used, the resolution R becomes less than λ/2n1.

Although several embodiments of the present invention have been illustrated and described in detail, it will be understood that different changes and alterations may be provided thereto without departing from the scope of the invention. These alterations may intervene at the level of the shape of the diffraction microstructures and of the pattern which they form. The various described alternatives should be understood as not being exclusive with each other.

CITED DOCUMENTS

[1] U.S. Pat. No. 5,125,750
[2] WO 00/23840
[3] WO 03/062864
[4] "Near-field optics simulation of a solid immersion lens combining with a conical probe and a highly efficient solid immersion lens-probe system" Yuan-Fong Chau et al., Journal of applied physics, Volume 95, Number 7, 1 Apr. 2004, pages 3378-3384.
[5] "Strategies for employing surface plasmons in near-field optical readout systems" Choon How Gan et al., Optics express, 20 Mar. 2006, Volume 14, No. 6, pages 2385-2397.
[6] US-A1-2005/0161594

The invention claimed is:

1. A near-field detection optical component operating in transmission, characterized in that it includes at least one portion (11b) forming at least one grating (11) of diffraction microstructures (11a) succeeding one another over several periods (p), this grating (11) being capable of converting evanescent waves (16) which are established between the component and an object (12) located in the near field when it reflects or emits a radiation having a wavelength, into propagating waves (16') by a diffraction effect during transmission, through the portion (11b) forming the grating (11) of diffraction microstructures (11a), the period (p) of the grating (11) being of the same order of magnitude as the wavelength of the radiation,
wherein the optical component further includes at least one portion (18) amplifying the evanescent waves (16) before their conversion, which cooperates with the portion (11b) forming the grating (11) of diffraction microstructures (11a).

2. The optical component according to claim 1, wherein the period (p) of the grating (11) is smaller than the radiation wavelength.

3. The optical component according to claim 1, wherein it has a lateral size (T) larger than several wavelengths of the radiation, or even substantially equal to about a hundred radiation wavelengths.

4. The optical component according to claim 1, wherein in the period (p) of the grating verifies the relationship kx−k0<2π/p<kx+k0 with k0=2π/λ and kx being the transverse component of the evanescent waves emitted by the object.

5. The optical component according to claim 1, wherein the period (p) of the grating verifies the relationship kx−2k0<2π/p<kx−k0 with k0=2π/λ and kx being the transverse component of the evanescent waves emitted by the object.

6. The optical component according to claim 1, wherein the amplifying portion (18) is placed side-by-side with the portion (11b) forming the grating (11) of diffraction microstructures (11a).

7. The optical component according to claim 1, wherein the amplifying portion (18) is made in a metal material based on gold, silver, platinum, aluminum, indium-antimony or in a semiconducting material.

8. The optical component according to claim 1, wherein the amplifying portion (18) has a thickness (h) substantially smaller than the wavelength of the radiation.

9. The optical component according to claim 1, wherein the amplifying portion (18) covers a face of the portion (11b) forming the grating (11) of diffraction microstructures (11a) on the opposite side from the diffraction microstructures (11a).

10. The optical component according to claim 1, wherein the amplifying portion (18) and the portion (11b) forming the grating (11) of diffraction microstructures are made in a same material.

11. The optical component according to claim 1, wherein it includes an alternating stack formed by at least one portion (11b) forming the grating of diffraction microstructures and by one or more amplifying portions (18) or else several portions (11b) each forming the grating of diffraction microstructures and at least one amplifying portion (18).

12. The optical component according to claim 1, wherein the portion (11b) forming the grating of diffraction microstructures is made in an electrically conducting material and/or in a dielectric material.

13. The optical component according to claim 1, wherein the grating (11) of diffraction microstructures includes protruding portions separated by recessed portions or solid portions separated by through-holes (20) or by solid electrically conducting portions separated by solid dielectric portions.

14. The optical component according to claim 1, wherein the grating (11) of diffraction microstructures includes substantially circular and concentric corrugations.

15. The optical component according to claim 1, wherein the grating (11) of diffraction microstructures is invariant under rotation.

16. The optical component according to claim 1, wherein the portion (11b) forming at least one grating (11) of diffraction microstructures is period-modulated.

17. The optical component according to claim 1, wherein the portion (11b) forming at least one grating of diffraction microstructures includes several gratings (R1, R2) side-by-side with different periods (p1', p2').

18. The optical component according to claim 1, wherein the portion (11b) forming at least one grating (11) of diffraction microstructures includes broken periodicity (19) in a central portion.

19. The optical component according to claim 18, wherein the broken periodicity is solid or is a void.

20. The optical component according to claim 19, wherein the void extends into the amplifying portion (18).

21. A near-field detection optical device wherein it includes an optical component according to claim 1.

22. The near-field detection optical device according to claim 21, wherein it includes a detector (17) placed downstream from the optical component for converted propagating waves (16').

23. The detection device according to claim 21, wherein it includes a solid immersion lens (21) placed downstream from the optical component (10), the solid immersion lens (21) being placed upstream from the detector (17) for converted propagating waves (16') in the presence of the detector (17).

24. The detection device according to claim 21, wherein this is a readout head or a read/write head on an optical information medium or a near-field optical microscope probe.

* * * * *

UNITED STATES PATENT AND TRADEMARK OFFICE
CERTIFICATE OF CORRECTION

PATENT NO. : 8,030,604 B2
APPLICATION NO. : 12/304131
DATED : October 4, 2011
INVENTOR(S) : Salim Mimouni et al.

It is certified that error appears in the above-identified patent and that said Letters Patent is hereby corrected as shown below:

In Column 2, line 48, please delete "-zk0>kx>k0" and replace therefore with
-- –k0 > kx > k0 --.

Signed and Sealed this
Thirty-first Day of January, 2012

David J. Kappos
*Director of the United States Patent and Trademark Office*